July 12, 1960 G. H. FARNSWORTH 2,945,137
BUS BAR JOINT FOR LOW IMPEDANCE TYPE BUS DUCT
Filed March 1, 1957 2 Sheets-Sheet 1
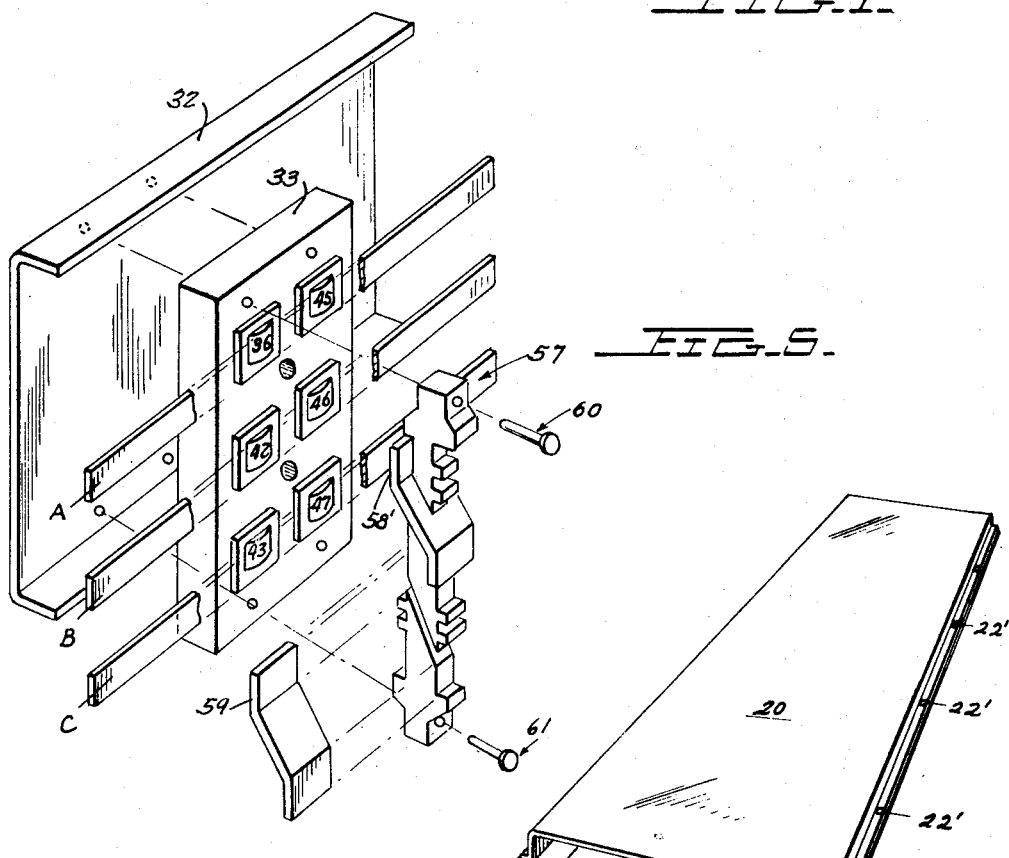
INVENTOR.
GEORGE H. FARNSWORTH
BY
ATTORNEYS July 12, 1960
G. H. FARNSWORTH
2,945,137
BUS BAR JOINT FOR LOW IMPEDANCE TYPE BUS DUCT
Filed March 1, 1957
2 Sheets-Sheet 2
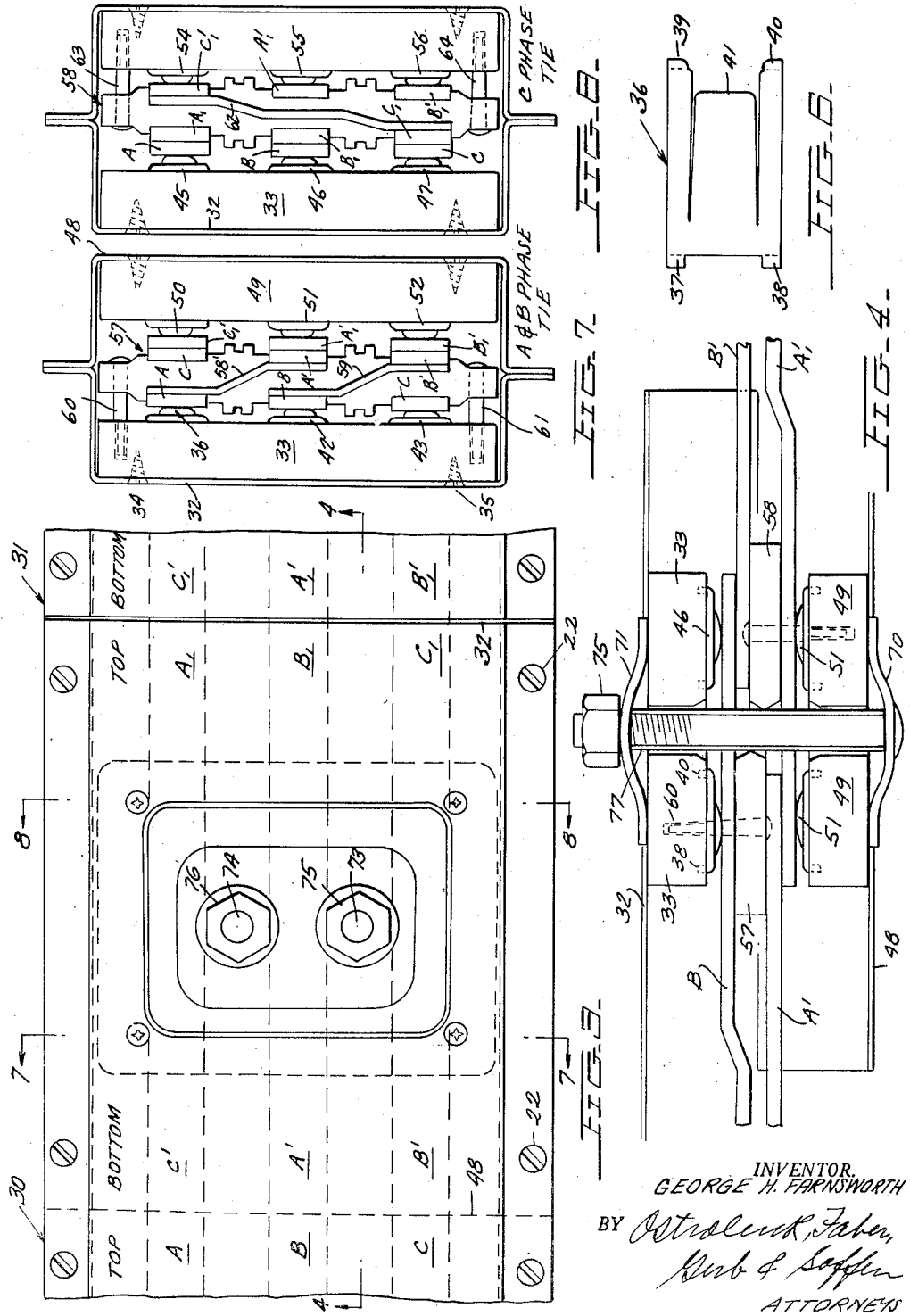
INVENTOR.
GEORGE H. FARNSWORTH
BY
ATTORNEYS

United States Patent Office 2,945,137
Patented July 12, 1960

2,945,137

BUS BAR JOINT FOR LOW IMPEDANCE TYPE BUS DUCT

George H. Farnsworth, Detroit, Mich., assignor, by mesne assignments, to I-T-E Circuit Breaker Company, Philadelphia, Pa., a corporation of Pennsylvania Filed Mar. 1, 1957, Ser. No. 643,463

10 Claims. (Cl. 307—147)

My invention relates to a means for joining bus duct units of the low reactance type without requiring machining of the buses at their connecting junction, and more specifically relates to a bus bar joining means which will electrically connect buses of the same phase within an individual bus duct unit so as to assure equal current distribution therebetween as well as joining associated bus bars of bus duct units forming a complete bus duct system.

A bus bar arrangement for a multiphase electrical distribution system has been shown in U.S. Patent 2,276,502 to A. A. Togesen et al. wherein a pair of conductors are provided for each phase and each bus or conductor is then placed in a closely spaced relationship with respect to a bus which results in a substantially 180° phase relationship between the currents of adjacent close-spaced buses.

When bus duct units are constructed in accordance with the above principle, it is desirable that the ends of the individual bus units be so adapted as to provide easy connection to the next unit and it is similarly desirable that this connection be made from either side of the duct since one side may always be inaccessible due to a wall or ceiling type of mounting.

It is further desirable that the pair of conductors corresponding to a particular phase be interconnected within each bus duct unit so as to ensure an equal current distribution between the conductors of this pair as has been shown in copending application Serial No. 643,373 filed March 1, 1957 entitled "Bus Duct Unit for Electrical Distribution System" to John A. Herrmann, now Patent No. 2,884,547, and assigned to the assignee of the instant invention.

As set forth in copending application Serial No. 630,154 filed December 24, 1956 entitled "Clamping Means for Joining Bus Duct Units" to John A. Herrmann and assigned to the assignee of the instant invention, a unitary connecting means is so constructed as to form a bolt connection between the ends of the buses of a first bus duct unit to the associated end of the buses of a second bus duct unit and at the same time, connect the buses of a common phase at this junction. If desired, this connecting means may take the form of a U-shaped jumper which could be made of copper and provided with open end slots which are adapted to engage protruding members such as a nut and bolt arrangement on the ends of each of the buses to be fastened.

However, in this arrangement, the cross-sectional area of buses at the connecting point is reduced in view of the bolt hole and furthermore, a machining operation to cut the hole is required.

The principle of my novel invention is to provide a jumper means which is embedded in a clamping means which automatically places and maintains the buses to be connected in high pressures surface contact with one another. Thus, the buses do not need a bolt hole with this invention and the current density of the bus may be maintained at a low value. Furthermore, the additional machining operation is not necessary.

Since installing personnel do not have to have bolting access to the buses when they are connected in accordance with my novel invention, I have further found it possible to form the connection between adjacent bus units by a connecting means which is etxernally operable from either side of the duct, thus considerably simplifying installation techniques.

Accordingly, a primary object of my invention is to provide a novel connecting means for a first and second bus duct unit which at the same time interconnects buses of a common phase within each of the individual bus duct units.

Another object of my invention is to provide a novel bus joining means which does not require machining the buses.

A still further object of my invention is to provide connecting means for connecting buses within a bus duct unit, said connecting means being embedded in a clamping means which automatically places and maintains the buses to be connected in high pressure surface contact with one another.

Another object of my invention is to provide a connecting means for buses of a bus duct unit which allows connection of adjacent duct units by means externally operable from either side of the unit.

These and other objects of my invention will become apparent from the following description in conjunction with the drawings, in which:

Figure 1 shows a top plan view of a bus duct unit.

Figure 2 shows a perspective view of the bus of Figure 1.

Figure 3 shows a top view of the end portions of two duct sections similar to the duct of Figures 1 and 2 when they are to be connected in accordance with my novel invention.

Figure 4 shows a sectional view of Figure 3 when taken across lines 4—4.

Figure 5 shows a perspective view of my novel connecting means connected to one-half of one of the bus ducts of Figure 4.

Figure 6 shows a top view of a spring bias means utilized in my invention.

Figure 7 shows a cross sectional view of Figure 3 when taken along the lines 7—7.

Figure 8 shows a cross sectional view of Figure 3 when taken along the lines 8—8.

Referring now to Figures 1 and 2, it is seen that a single bus duct unit is comprised of a network of six bus bars, A, A', B, B', C and C', wherein bus bars A and A', B and B', and C and C' are energized from a first, second and third phase respectively. However, in accordance with U.S. Patent 2,287,502 described above, phases A and C', C and B', and B and A', are respectively positioned in close-spaced relationship with one another so as to offer a very low reactance system.

The above noted bus bars of Figure 1 may be supported in any desired manner from the bus duct housing which is comprised of duct halves 20 and 21. These halves are seen to have flanged ends 22 and 23 respectively which flanges allow a connection between the two duct halves 20 and 21 by means of the bolt arrangement such as the bolts 22' which interconnect the flanges 22 and 23. It is further seen that the duct halves 20 and 21 are positioned with respect to one another to provide a scarf lap joint upon connection to another bus duct unit which is constructed in an identical manner.

Figure 3 shows a top view of the end portions of two bus duct units 30 and 31 which are of the type set forth in Figures 1 and 2. Thus, the buses of unit 30 are identified as buses A, B, C, A', B' and C' while buses $A_1$, $B_1$, $C_1$, $A_1'$, $B_1'$ and $C_1'$ correspond to unit 31, the unprimed buses being at the top of the unit and the primed buses being at the bottom of the unit as indicated by the legend of Figure 3.

As has been stated above, it is desired that the buses A′, C, C′, B, B′, A and $A_1′$, $C_1$, $C_1′$, $B_1$, $B_1′$, $A_1$ respectively be fastened together so as to provide continuity of the bus run system and it is further desired to interconnect the pair of buses corresponding to each phase so as to assure an equal current distribution therebetween. That is to say, it is desired to electrically connect buses A and A′, C and C′, and so on and it is desired that this connection be made for each bus unit and by the same means that interconnects the buses of the first and second unit.

Furthermore, it is desirable that the interconnection between the buses be of the type in which no machining of the bus (such as through holes or tapped holes is required).

My novel connecting means which provides all of the above noted desired features may be seen in Figures 4, 5, 7 and 8, where Figure 5 shows a portion thereof in an exploded perspective view.

More specifically, Figures 4, 5 and 7 show bus bar duct half 32 of unit 30 as having a base 33 constructed of insulating material fastened thereto by screw means 34 and 35 (Figure 7).

A heavy spring member shown in Figure 6 as spring member 36 is then constructed to have protruding fingers 37 through 40 at each respective corner thereof which, as seen in Figure 4, are embedded into support member 33 so as to be supported thereby with the central portion 41 arced for subsequent biasing engagement with a bus.

As may be best seen in Figures 5 and 7, base member 33 is provided with two further spring members 42 and 43 which are each constructed in the same manner as was spring member 36 where spring members 36, 42 and 43 are respectively positioned to engage buses A, B and C of bus duct unit 30.

A second half of base member 33, best seen in Figures 4 and 8, is constructed in an identical manner as the half carrying springs 36, 42 and 43 and carries spring bias members 45, 46 and 47, each constructed as is spring member 36 of Figure 6 and positioned as seen in Figure 8 for engagement with buses C, A and B respectively.

It is now to be noted that the protruding duct half at the end of each bus duct unit of a bus duct system is to be adapted with a base member such as base member 33 as described above for duct unit half 32 when using my novel invention.

Thus the protruding duct half 48 of duct unit 31 is, as seen in Figures 4 and 7, provided with a base 49 which is in registry with base 33 of duct half 32 and carries thereon spring members 50, 51 and 52 which engage buses $C_1′$, $A_1′$ and $B_1′$ respectively. In a similar manner, Figures 4 and 8 show base member 49 carrying spring members 54, 55 and 56 which engage buses $C_1′$, $A_1′$ and $B_1′$ respectively.

As seen in Figures 4, 7 and 8, support members 57 and 58 are provided to support the buses against their respective spring biases and to interconnect buses of a like phase.

Support member 57 is best seen in Figure 5 as being comprised of an insulating material and having jumpers 58′ and 59 embedded therein in any desired manner. Support member 57 is further seen in Figures 5 and 7 as being fastened to base member 33 by means of insulated members 60 and 61 while support member 58 has jumper 62 embedded therein as shown in Figure 8 in a similar manner as the jumpers 58′ and 59 fastened to support member 57 and is connected to base member 49 by insulated connecting means 63 and 64.

Support member 57 as best seen in Figure 7 is provided with a plurality of depressions which receive buses A, B, C, C′, A′ and B′ in supporting relationship and is further provided with protruding ridges between adjacent buses to increase the creepage distance therebetween.

Jumper 58′ however, is positioned to have one end thereof engage the surface of bus A while its other end engages bus A′ which is positioned adjacent to and in electrical contact with bus $A_1′$. In a similar manner, jumper 59 engages buses B and B′ where bus B′ is adjacent to and in electrical contact with bus $B_1′$.

Support member 58 as best seen in Figure 8 is constructed to have notches to receive buses $A_1$, $B_1$, $C_1$, $C_1′$, $A_1′$ and $B_1′$, while jumper 62 electrically connects buses $C_1′$ and $C_1$, bus $C_1$ being adjacent to and in electrical contact with bus C. Similar to support member 57, support member 58 has notches between the buses of different phase to increase the creepage distance therebetween.

Thus, when the two duct halves 32 and 48 are brought together and fastened as will be described hereinafter, the buses adjacent their respective biasing means will be biased into engagement with either one of the jumpers 58′, 59 or 62 or with a bus of a corresponding phase.

By way of example, spring 36 of Figure 7 will force bus A into high pressure engagement with jumper 58′ while spring 51 biases buses A′ and $A_1′$ into high pressure contact engagement with jumper 58′. Furthermore, spring 45 of Figure 8 will place buses A and $A_1$ into high pressure electrical engagement so that all four buses A, A′, $A_1$, and $A_1′$ will be electrically tied together at the junction of the two bus duct units 30 and 31. In a similar manner, buses B, B′, $B_1$ and $B_1′$, and C, C′, $C_1$ and $C_1′$ respectively will be tied together as shown in Figures 7 and 8.

Hence, electrical continuity from one bus unit to a second is obtained and buses of similar phases are interconnected within each unit to avoid current unbalance problems by a connecting means that does not require machining of the buses for bolt type connections and does not reduce the current carrying cross-sectional area of the bus at the connecting point.

The manner in which the two bus duct units may be connected together is shown in Figures 3 and 4 which show heavy spring members 70 and 71 fastened to bus duct halves 48 and 32 respectively. Each of spring members 70 and 71 have apertures therein for passing bolts 73 and 74 respectively insulated with dielectric tubing 77 and having nuts 75 and 76 respectively fastened thereto to rigidly connect bus halves 32 and 48 to one another.

Thus when installing a bus duct system, the connecting screws such as 22 of Figure 3 are first installed to obtain the high mechanical strength scarf lap joint and the connecting bolts 73 and 74 are thereafter fastened by bolts 75 and 76 respectively to draw the buses of Figures 7 and 8 into high pressure engagement with their corresponding spring bias means.

It is to be noted that the fastening of the two bus duct unit 30 and 31 is done from an external area of the bus duct units and that internal access to the bus housing is not required.

Furthermore, the installation can proceed from either side of the bus in the event that one side is inaccessible.

Although I have described preferred embodiments of my novel invention, many variations and modifications will now be evident to those skilled in the art. I prefer, therefore, to be limited not by the specific description herein, but only by the appended claims.

I claim:

1. A bus duct unit for a three phase bus duct system; said bus duct unit comprising a first and second bus for each phase supported within a housing; each of said buses having a relatively flat cross-section; one bus of each of said three phases being coplanar in a first plane; the other bus of each of said three phases being coplanar in a second plane parallel to said first plane; each bus in said first plane being positioned adjacent to a bus in said second plane; the currents through the buses of each pair of buses positioned adjacent to one another being substantially 180° phase displaced with respect to one another; a resilient biasing means positioned in registry with each of said buses and supported by said bus housing at one end thereof; and a support means of insulating material; said support means being carried with respect to said duct housing and carrying a jumper means of current conducting material; said jumper means being positioned to electrically engage one of said buses; said resilient biasing means being positioned to bias and maintain said one of said buses into electrical engagement with said jumper means independently of bolt means to retain the complete cross-sectional area of said one of said buses.

2. A bus duct unit for a three phase bus duct system; said bus duct unit comprising a first and second bus for each phase supported within a housing; each of said buses having a relatively flat cross-section; one bus of each of said three phases being coplanar in a first plane; the other bus of each of said three phases being coplanar in a second plane parallel to said first plane; each bus in said first plane being positioned adjacent to a bus in said second plane; the currents through each pair of buses positioned adjacent to one another being substantially 180° phase displaced with respect to one another; a base member connected to one end of said duct housing; said base member having resilient bias means mounted thereon and positioned in respective registry with each of said buses in said first plane; a support means of insulating material; said support means being connected to said base member; said support means having jumper means of current carrying material supported thereby; said jumper means being positioned to electrically engage one of said buses; said resilient biasing means being positioned to bias and maintain said one of said buses into electrical engagement with said jumper means independently of bolt means to retain the complete cross-sectional area of said one of said buses.

3. In a multiphase bus duct comprised of individually series connectible bus duct units, each of said individual bus duct units comprising a first and second bus for each phase supported within a housing; each of said buses being positioned with respect to one another to provide a low reactance system; each of said bus duct units having a resilient biasing means positioned in registry with each of said buses and supported by said bus housing at one end thereof and a support means of insulated material; said support means being carried with respect to said duct housing and carrying a jumper means of current conducting material; said jumper means being positioned to electrically engage one of said buses; said resilient biasing means being positioned to bias and maintain said one of said buses into electrical engagement with said jumper means independently of bolt means to retain the complete cross-sectional area of said one of said buses.

4. In a multiphase bus duct comprised of individually series connectible bus duct units, each of said individual bus duct units comprising a first and second bus for each phase supported within a housing; each of said buses being positioned with respect to one another to provide a low reactance system; each of said bus duct units having a base member connected to one end of said duct housing; said base member having resilient bias means mounted thereon and positioned in respective registry with said three buses in said first plane; a support means of insulating material; said support means being connected to said base member; said support means having jumper means of current carrying material fastened thereto; said jumper means being positioned to electrically engage one of said buses; said resilient biasing means being positioned to bias and maintain said one of said buses into electrical engagement with said jumper means independently of bolt means to retain the complete cross-sectional area of said one of said buses.

5. In a multiphase bus duct comprised of individually series connectible bus duct units, each of said individual bus duct units comprising a first and second bus for each phase supported within a housing, each of said buses being positioned with respect to one another to provide a low reactance system, each of said bus duct units having a resilient biasing means positioned in registry with each of said buses and supported by said bus housing at one end thereof and a support means of insulated material; said support means being supported with respect to said duct housing and carrying a jumper means of current conducting material; said jumper means being positioned to electrically engage one of said buses; said resilient biasing means being positioned to bias and maintain said one of said buses into electrical engagement with said jumper means independently of bolt means to retain the complete cross-sectional area of said one of said buses; said jumper means being electrically connectible to a bus of the same phase in an adjacent bus duct unit as said electrically engaged bus when said bus duct units are connected.

6. In a multiphase bus duct comprised of individually series connectible bus duct units, each of said individual bus duct units comprising a first and second bus for each phase supported within a housing; each of said buses being positioned with respect to one another to provide a low reactance system; each of said bus duct units having a resilient biasing means positioned in registry with each of said buses and supported by said bus housing at one end thereof and a support means of insulated material; said support means being supported with respect to said duct housing and carrying a jumper means of current conducting material; said jumper means being positioned to electrically engage one of said buses; said resilient biasing means being positioned to bias and maintain said one of said buses into electrical engagement with said jumper means independently of bolt means to retain the complete cross-sectional area of said one of said buses; and connecting means for mechanically connecting said adjacent duct units; said connecting means being operable externally of said bus duct housings.

7. A bus duct unit for a three phase bus duct system; said bus duct unit comprising a first and second bus for each phase supported within a housing; each of said buses having a relatively flat cross-section; one bus of each of said three phases being coplanar in a first plane; the other bus of each of said three phases being coplanar in a second plane parallel to said first plane; each bus in said first plane being positioned adjacent to a bus in said second plane; the currents through each pair of buses positioned adjacent to one another being substantially 180° phase displaced with respect to one another; a resilient biasing means positioned in registry with each of said buses and supported by said bus housing at one end thereof; and a support means of insulated material; said support means carrying a first, second and third jumper means; said jumper means being constructed to interconnect buses of like phases when said bus duct unit is connected to a bus duct unit adjacent thereto; each of said resilient biasing means biasing and maintaining their corresponding buses into high pressure engagement with said corresponding jumper means when said bus duct unit and said adjacent bus duct unit are connected to one another; said buses retaining their full cross-sectional area.

8. In a multiphase bus duct comprised of individually series connectible bus duct units, each of said individual bus duct units comprising a first and second bus for each phase supported within a housing; each of said buses being positioned with respect to one another to provide a low reactance system; each of said bus duct units having a resilient biasing means positioned in registry with each of said buses and supported by said bus housing at one end thereof and a support means of insulated material; said support means carrying a jumper means;

said jumper means being constructed to interconnect buses of like phases when its respective bus duct unit is connected to a bus duct unit adjacent thereto; each of said resilient biasing means biasing and maintaining their corresponding buses into high pressure engagement with said corresponding jumper means when their respective bus duct unit and an adjacent bus duct unit are connected to one another; each of said buses retaining their full cross-sectional area.

9. In a multiphase bus duct comprised of individually series connectible bus duct units, each of said individual bus duct units comprising a first and second bus for each phase supported within a housing; each of said buses being positioned with respect to one another to provide a low reactance system; each of said bus duct units having a resilient biasing means positioned in registry with each of said buses and supported by said bus housing at one end thereof and a support means of insulated material; said support means carrying a jumper means; said jumper means being constructed to interconnect buses of like phases when its respective bus duct units is connected to a bus duct unit adjacent thereto; each of said resilient biasing and maintaining means biasing their corresponding buses into high pressure engagement with said corresponding jumper means when their respective bus duct unit and an adjacent bus duct units are connected to one another each of said buses retaining their full cross-sectional area; and connecting means for mechanically connecting adjacent bus duct units; said connecting means being operable externally of said bus duct housings.

10. In a multiphase bus duct comprised of individually series connectible bus duct units, each of said individual bus duct units comprising a first and second bus for each phase supported within a housing; each of said buses being positioned with respect to one another to provide a low reactance system; each of said bus duct units having a resilient biasing means positioned in registry with each of said buses and supported by said bus housing at one end thereof and a support means of insulated material; said support means carrying a jumper means; said jumper means being constructed to interconnect buses of like phases when its respective bus duct unit is connected to a bus duct unit adjacent thereto; each of said resilient biasing and maintaining means biasing their corresponding buses into high pressure engagement with said corresponding jumper means when their respective bus duct unit and an adjacent bus duct unit are connected to one another each of said buses retaining their full cross-sectional area; said support means being constructed to receive and position said buses, said support means having ridges thereon positioned to increase creepage distance between buses of unlike phase.

References Cited in the file of this patent

UNITED STATES PATENTS

| 2,274,422 | Mahoney et al. | Feb. 24, 1942 |
| 2,287,502 | Togesen et al. | June 23, 1942 |
| 2,372,267 | Frank et al. | Mar. 27, 1945 |

FOREIGN PATENTS

| 562,485 | France | Sept. 6, 1923 |